March 26, 1968   E. T. KORNYLAK   3,374,877
SECTIONALIZED POWER DRIVEN CONVEYOR
Filed Aug. 19, 1964   2 Sheets-Sheet 2

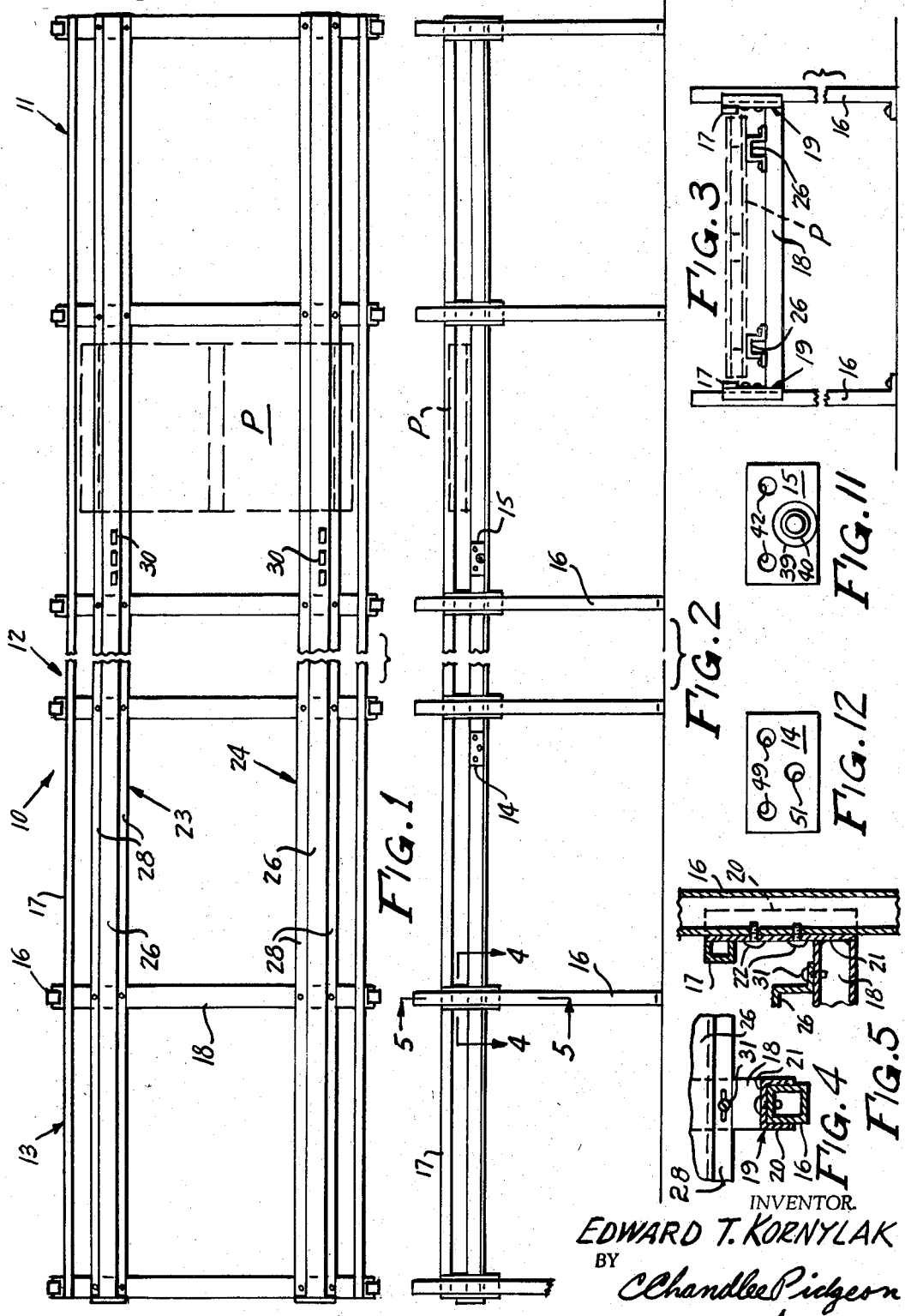

INVENTOR.
EDWARD T. KORNYLAK
BY
Chandlee Pidgeon
AGENT.

United States Patent Office 3,374,877
Patented Mar. 26, 1968

3,374,877
SECTIONALIZED POWER DRIVEN CONVEYOR
Edward T. Kornylak, Hamilton, Ohio, assignor to Kornylak Corporation, Hamilton, Ohio, a corporation of New Jersey
Filed Aug. 19, 1964, Ser. No. 390,576
5 Claims. (Cl. 198—127)

This invention relates to a sectionalized power driven conveyor, and particularly such a conveyor for handling relatively heavy loads such as loaded pallets.

An object of this invention is the provision of means for assembling a power driven conveyor of desired length by using a plurality of pre-formed sections.

Another object is the provision of a power driven roller type pallet conveyor having protected roller driving means.

A further object of this invention is the provision of gear driven means for the rollers of a pallet conveyor including gears on the roller shafts that may be smaller in diameter than that of the rollers.

An additional object of this invention is the provision of gear driven rollers for a power driven roller way pallet conveyor wherein the gears are fully enclosed to prevent entry of dirt, trash, etc., into the gears.

Still another object of this invention is the provision of sectional roller conveyor rails having means between the ends of certain sections for supporting the means for supplying torque to drive the rollers.

Another object of this invention is the provision of means for coupling adjacent sections of a rollerway whereby conveyors of desired length may be readily assembled and disassembled.

The above and other objects will become apparent upon consideration of the following specification taken with the accompanying drawings forming a part thereof.

In the drawings wherein like parts are represented by like characters of reference throughout the several views.

In the drawings:

FIG. 1 represents a plan view of a pallet conveyor according to this invention;

FIG. 2 is a side elevation;

FIG. 3 is an end elevation;

FIG. 4 is a fragmentary section on the line 4—4 of FIG. 2;

FIG. 5 is a fragmentary section on the line 5—5 of FIG. 2;

FIG. 11 is a face view of a connecting plate for supporting a drive shaft;

FIG. 12 is a face view of a connecting plate for supporting a transfer shaft.

Figure 6:
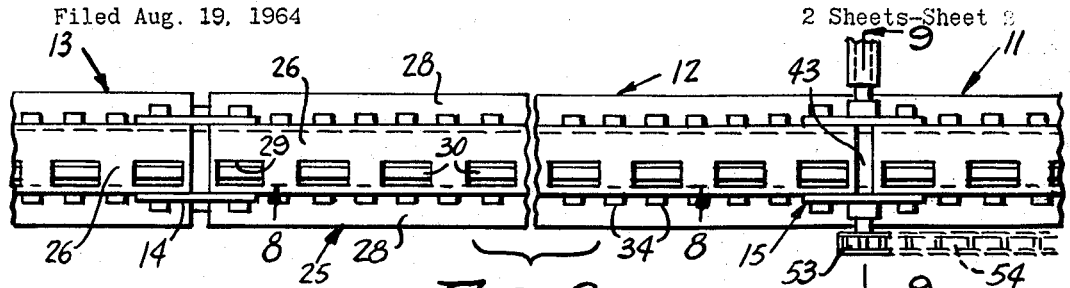
FIG. 6 is a partial plan view of a single rollerway showing portions of three sections.
Figure 7:
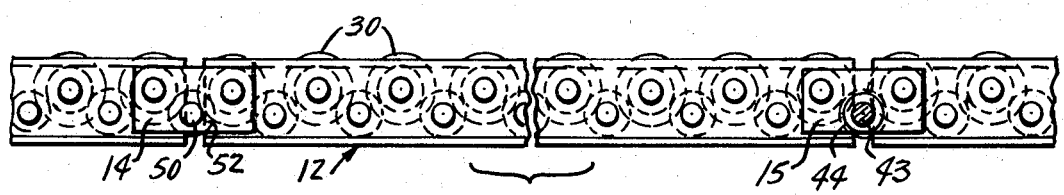
FIG. 7 is an elevation of the structure shown in FIG. 6.
Figure 8:
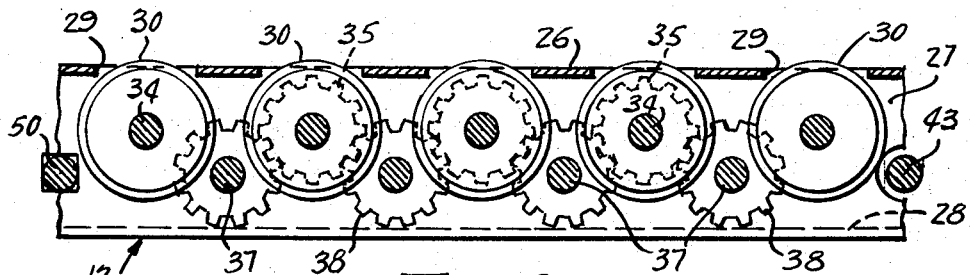
FIG. 8 is a fragmentary section taken on the line 8—8 of FIG. 6.
Figure 9:
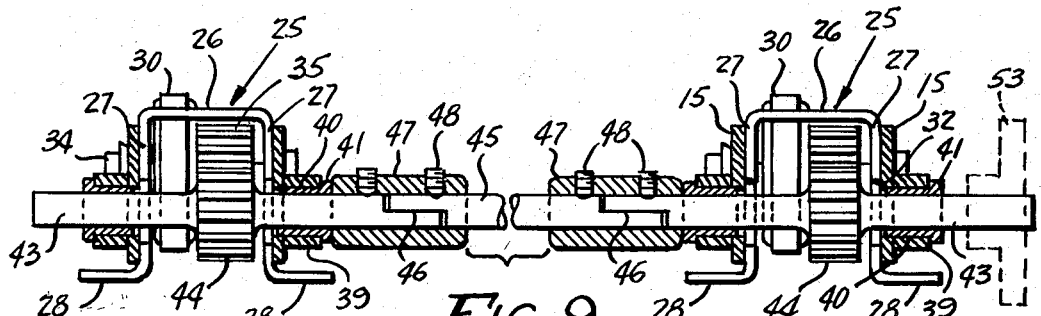
FIG. 9 is a section taken on the line 9—9 of FIG. 6, with the sprocket shown at the other end of the shaft.
Figures 10, 13:
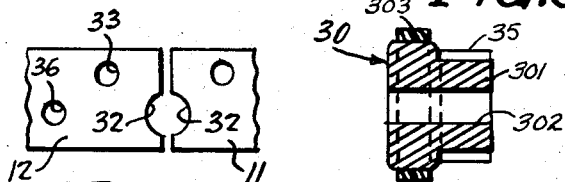
FIG. 10 is a fragmentary view of two adjacent channel sections.
FIG. 13 is a vertical section through a roller and its gear.

The conveyor 10 is comprised of conveyor sections 11, 12, and 13, as shown, but may include any suitable number of sections of suitable lengths. In practice sections of rail are made in two or more lengths, such as 5 feet and 10 feet, connected by the means of plates 14 and 15.

The conveyor 10 is supported on a suitable frame work consisting of standards or posts 16 and side rails 17 which are parallel and are tied together by cross beams 18. The side rails 17 also act as guard rails for the pallets P. The cross beams 18 have integral channel shaped bracket members 19 the legs of 20 of which embrace the box type posts 16 and the bottom 21 of which is secured to the post 16 by any suitable means, such as screws 22. The side rails 17 are secured to the brackets 19 in any suitable manner so as to be easily assembled and disassembled. It is also within the purview of this invention to rest the cross beams 18 and conveyor sections on a suitable floor or platform, thus eliminating the posts 16 and side rails 17.

The conveyor rails 11, 12 and 13 are assembled on the cross beams 18 into parallel rollerways 23 and 24. As each section is like any other section, except perhaps for length, a description of one section such as 12 will suffice. The rail section 12 comprises an inverted U-shaped channel 25 having a base 26, legs 27 and flanges 28 extending laterally from the legs 27. In the base 26, adjacent one leg 27 there are longitudinally spaced openings 29. Spaced power driven rollers 30 extend the length of the rails 11, 12 and 13, and a portion of each of the rollers 30 projects through an opening 29. Each roller 30 has a hub member 301 and an axial bore 302 and a rim or tire 303 of tough elastomeric material. The flanges 28 are fastened to the cross beams 18 by any suitable means such as screws 31.

Each of the channel legs 27 is notched at either end as at 32 to accommodate a bearing as will be later described. Each side wall or leg 27 of the channels 25 has a longitudinally extending row of openings 33 to accommodate axle pins 34 which support the rollers 30. Formed integrally with the bodies of the rollers 30 are gears 35 formed on the hubs 301. A lower row of openings 36 extends longitudinally of each leg 27 below and intermediate the openings 33. These openings 34 support the axle pins 37 of pinions 38. The pins 34 and 37 and/or the rollers 30 and gears 38 may be provided with any suitable bearings in a manner well known in the art.

For driving the roller 30, the plate 15 is provided with a boss 39 which supports a bushing 40 having a flange 41 at its outer end resting against the outer end of the boss 39. The plate 15 also has openings 42 to fit over the ends of adjacent axle pins 34. The boss 39 is accommodated in the space formed by the notches 32. Each pair of plates 15 on a pair of rails 12 and 13 supports a stub shaft 43 on which is formed a gear 44 which meshes with the adjacent gear 35 on the adjacent roller 30, at the end of each section 11 and 12. The stub shaft 43 is halved off at one end to accommodate a similarly prepared shaft section 45 which together form a spline connection 46. The shaft sections 43 and 45 are held together by means of a sleeve 47 fixed thereon by means of screws 48. Obviously, the shaft section 45 may be made up in a number of suitable lengths to accommodate various separations of the rollerways 23, 24.

The plates 14 are provided with upper openings 49 to engage over the ends of the axle pins 39 adjacent the ends of two connected rollerway sections such as 12 and 13. An axle shaft 50 is accommodated in the opening 51 and the adjacent notches 32. The axle shaft 50 has a gear 52 mounted thereon which engages the gears 35 on the rollers 30 adjacent the confronting ends of the rails 12 and 13. One of the stub shafts 43 is provided with a sprocket 53 connected by a chain 54 to a suitable source of power. It will now be apparent that when the sections are assembled as above described, and the shafts 43 are coupled by the shafts section 45; when power is applied to the shafts 43 by means of the sprockets 53 and chain 54, the rollers 30 are rotated to forward a pallet P. It is to be understood that the sprocket 53 and chain 54 may be replaced by any suitable known power source or connection.

Having described my invention in a preferred form, I desire it to be understood that various changes and modifications may be made within the skill of the art and the scope of the appended claims.

I claim:

1. A conveyor section comprising a rollerway with power driven rollers, wherein the rollerway includes an inverted channel with a top web and vertical side walls, the top web having aligned longitudinally spaced openings therein adjacent one vertical side wall, axle means in said vertical side walls, rollers on said axle means and projecting slightly through said openings, each said roller comprising a hub rotatably mounted on said axle means, and having a hard elastomeric tire thereon and means within said channels for driving said rollers, said means comprising a gear formed on said hub adjacent said roller, at one side thereof, the channels are further provided with axle means mounted intermediate and below said rollers and including gears mounted on said latter mentioned axle means, said gears meshing with the gears on said hubs, and means for driving one of said gears.

2. The structure as defined in claim 1 wherein a plurality of rollerways are connected end to end and the means to drive one of the gears comprises a shaft located between adjacent sections and having a gear thereon, and means to connect said shaft to a source of power.

3. The structure as defined in claim 2 wherein the adjacent rollerways are connected by suitable plates, said plates having bearing bosses thereon for supporting said shafts.

4. The structure as defined in claim 2 wherein other adjacent sections are connected by suitable plates having openings for supporting idler gears between the sections to transfer torque from one section to the next.

5. The structure as defined in claim 2 wherein the mating ends of adjacent rollerways are provided with arcuate notches to accommodate the gear supporting shafts.

References Cited
UNITED STATES PATENTS

| | | | |
|---|---|---|---|
| 597,114 | 1/1898 | Jamieson | 198—127 X |
| 1,898,120 | 3/1933 | Farmer | 198—127 |
| 2,786,578 | 3/1957 | DeGraaf et al. | 193—35 X |
| 2,793,736 | 5/1957 | Thomson | 198—127 |
| 2,964,155 | 12/1960 | Flowers et al. | 193—35 |
| 3,124,238 | 3/1964 | Tyler | 198—192 |

RICHARD E. AEGERTER, *Primary Examiner.*

SAMUEL F. COLEMAN, EVON C. BLUNK,
*Examiners.*

R. E. KRISHER, A. C. HODGSON, *Assistant Examiners.*